United States Patent
Dufour

(10) Patent No.: US 6,807,424 B2
(45) Date of Patent: Oct. 19, 2004

(54) CONSIDERATION OF HISTORICAL MAHO MEASUREMENTS FOR FREQUENCY PLAN REVISION DETERMINATIONS

(75) Inventor: Daniel Dufour, Blainville (CA)

(73) Assignee: Telefonaktiegolaget LM Ericsson (publ), Stockholm (SE)

( * ) Notice: Subject to any disclaimer, the term of this patent is extended or adjusted under 35 U.S.C. 154(b) by 599 days.

(21) Appl. No.: 09/823,466

(22) Filed: Mar. 30, 2001

(65) Prior Publication Data

US 2002/0142775 A1 Oct. 3, 2002

(51) Int. Cl.[7] .................................................. H04Q 7/20
(52) U.S. Cl. ..................... 455/447; 455/62; 455/67.11; 455/439; 455/452.2
(58) Field of Search ............................ 455/423, 424, 455/425, 434, 446, 447, 450, 509, 452.2, 62, 439, 67.11, 436, 226.1, 226.2

(56) References Cited

U.S. PATENT DOCUMENTS

| | | | |
|---|---|---|---|
| 5,375,123 A | | 12/1994 | Andersson et al. ......... 370/95.1 |
| 5,905,955 A | * | 5/1999 | Bamburak et al. .......... 455/434 |
| 5,966,657 A | * | 10/1999 | Sporre ........................ 455/425 |
| 6,032,046 A | * | 2/2000 | Nakano ...................... 455/450 |
| 6,035,207 A | * | 3/2000 | Wang et al. ................ 455/509 |
| 6,052,593 A | | 4/2000 | Guimont et al. ............ 455/446 |
| 6,212,386 B1 | * | 4/2001 | Briere et al. ................ 455/447 |
| 6,424,836 B1 | * | 7/2002 | Gil et al. .................... 455/450 |
| 6,560,459 B1 | * | 5/2003 | Wong ......................... 455/447 |

* cited by examiner

*Primary Examiner*—Congvan Tran
(74) *Attorney, Agent, or Firm*—Jenkens & Gilchrist

(57) ABSTRACT

Radio environment statistics data useful in determining frequency plan revisions is collected in each one of a plurality of separate recording periods. Following conclusion of each recording period, a frequency plan revision algorithm is executed to process the collected radio environment statistics data and determine a frequency plan revision for implementation. The collected data that is considered by the algorithm includes not only that data which was collected in a current recording period, but also that data collected in previous recording period(s) thereto. More specifically, only the previous recording period data that is considered reliable is processed by the algorithm along with the current recording period data. Reliable data is identified as that data relating to a measurement made on frequency whose radio environment statistics have not been adversely affected by an implementation of a frequency plan revision in the meantime since making the measurement.

29 Claims, 3 Drawing Sheets

CONSIDERATION OF HISTORICAL MAHO MEASUREMENTS FOR FREQUENCY PLAN REVISION DETERMINATIONS

CROSS-REFERENCE TO RELATED PATENTS

The present application is related to U.S. Pat. No. 6,052,593 entitled "Method for Frequency Mode Validation for, Frequency Assignment for, and Evaluating the Network Effect of a Frequency Plan Revision within a Dual Mode Cellular Telephone System" by Guimont, et al., the disclosure of which is hereby incorporated by reference.

The present application is also related to U.S. Pat. No. 6,212,386 entitled "Automated Tool and Method for Frequency Plan Revision within a Cellular Telephone System" by Briere, et al., the disclosure of which is hereby incorporated by reference.

BACKGROUND OF THE INVENTION

1. Technical Field of the Invention

The present invention relates to cellular telephone systems, the making of frequency plan revisions within such systems and, in particular, to the collection of radio environment statistics data, especially downlink data, that is evaluated in connection with the making of such revisions.

2. Description of Related Art

The following background discussion is presented in the context of some of the frequency plan revision procedures taught by U.S. Pat. No. 6,052,593 (hereinafter referred to as the "Guimont Patent") and U.S. Pat. No. 6,212,386 (hereinafter referred to as the "Briere Patent"). The disclosure of each Patent has been incorporated by reference, and thus only a general, very broad, discussion of these procedures is presented herein in order to provide the reader with sufficient background information useful in understanding certain concerns with these procedures that are addressed by the present invention. For a more detailed understanding of these frequency plan revision procedures, the reader is requested to directly consult the Guimont and Briere Patents, as well as other references discussing operations for manual and automatic frequency planning for cellular telephone networks.

Reference is now made to FIG. 1 (which is based on FIG. 2 of the Guimont Patent) illustrating one type of frequency plan revision procedure. In step 100, radio environment statistics measurements are made with respect to a cell. These measurements, made on a cell by cell basis in accordance with known procedures, include a measurement of the uplink interference with respect to not only selected (i.e., currently used) frequencies for that cell, but also candidate (i.e., not currently used, but available) frequencies for that cell. These measurements further include a measurement of uplink and downlink bit error rate.

Next, in step 102, analysis is made of the reported radio environment statistics measurements for a given cell. This analysis is typically referred to as an evaluation, and involves the calculation (either manual or automated), with respect to each sub-frequency group containing selected frequencies, and each sub-frequency group containing candidate frequencies, of the average interference and bit error rate values.

In step 104, the results of the evaluation (step 102) are used to determine a possible frequency plan reshuffling for a given cell. The determined reshuffling of step 104 typically comprises the removal of certain ones of the selected sub-frequency groups which show unacceptable analyzed radio environment statistics measurements, in favor of a replacement with certain ones of the candidate sub-frequency groups which show acceptable analyzed radio environment statistics measurements. Many reshufflings 104 may be determined and considered before settling in step 106 on one or more of the reshufflings. These chosen reshufflings of step 106 are commonly (and hereinafter) referred to as "proposals" for changes in the frequency plan of the cellular telephone system for a certain cell.

Each of the proposals 106 is next submitted for frequency mode validation in step 110 which determines whether the candidate sub-frequency groups within the proposal for a given cell are valid (i.e., fit) with respect to the current physical configuration (i.e., the number and operating capabilities of the included transceivers) of that cell and in particular its base station.

Next, the frequencies within the candidate sub-frequency groups are hypothetically distributed in step 120 to the transceivers of the current cell configuration. Next, a network validation check is made in step 130 on the proposal 106 to determine whether any adverse consequences to the network might arise from an actual (i.e., physical as opposed to hypothetical) implementation of the proposal.

Approved proposals 106 are then submitted in step 150 for pre-update verification which tests for unacceptable interference by considering both the uplink interference radio statistic measurements previously made in step 100 and currently made mobile assisted handoff (MAHO) downlink interference measurements.

A proposal for a cell which is confirmed through pre-update verification is then implemented in step 160 to effectuate a retune of the transceivers in that cell to the frequencies which were assigned in the automatic frequency assignment process of step 120.

Reference is now made to FIG. 2 (which is based on FIG. 2 of the Briere Patent) illustrating another frequency plan revision procedure. The procedure implements a three-pass operation. A first pass, identified generally by arrow 200, is referred to as evaluation. The evaluation pass 200 creates one or more revision proposals for one or more cells in response to the consideration of radio environment statistics measurements which report uplink interference measurements and uplink/downlink bit error rate measurements. A second pass, identified generally by arrow 202, is referred to as pre-update verification. The pre-update verification pass 202 is performed to confirm no more than one proposal for each cell in response to the additional consideration of downlink interference measurements. A third pass, identified generally by arrow 204, is referred to as post-update verification. The post-update verification pass 204 verifies, following network update in accordance with one of the proposals, that network interference levels following the update are satisfactory.

First, a conventional radio environment statistics recording function is used to collect uplink interference measurements and uplink/downlink bit error rate measurements in step 206. The evaluation pass 200 processes the measurements to determine proposed frequency plan reshuffling(s) for a given cell. Next, each proposal is validated against certain validation rules relating, for example, to channel allocation and data required for hand-off. An option (step 210) is then given to request pre-update verification 202 (executed at step 216) for each of the created proposals (using the step 214 made downlink interference measurements and additional step 206 measurements) to narrow the proposal options to one (best or preferred) proposal per cell.

Acceptable proposals are then implemented through a network update retune (step 212). An option (step 220) is then given to engage in post-update verification 204 for each of the accepted and implemented proposals. This pass 204 assists the operator in identifying implemented (i.e., deployed) proposals that do not satisfactorily reduce interference and improve network operation. Additional step 214 and step 206 measurements are made and evaluated in step 222 to either (step 224) confirm the deployed proposal or identify (step 226) deployed proposals that should be abandoned through a roll-back in step 228.

Specific attention is now directed to the radio environment statistics measurements (i.e., the data collection efforts) made in connection with frequency revision planning (whether manual or automatic) like those taught above by steps 100 and 150 of FIG. 1, and steps 206 and 214 of FIG. 2. It is important to obtain a sufficient number of data points in order to perform the proposal related calculations (see, for example, the algorithm and particularly step 102 of FIG. 1, and the algorithm and particularly steps 208, 216 and 222 of FIG. 2). Sufficiency is generally not an issue with respect to those measurements made on the uplink by network base stations. The system can configure the base stations, and the base stations typically have enough resources and available time to collect the right amount of data. With respect to downlink measurements, on the other hand, it has been noticed that in some instances the amount of collected downlink data is insufficient to execute the proposal related calculation algorithm.

The reason for this is related to the fact that the downlink measurements are normally made by the mobile stations in connection with their conventional Mobile Assisted Handoff (MAHO) operation. While a mobile station is engaged in a call, the system instructs the mobile station to make the needed frequency plan revision related downlink measurements by borrowing certain measurement opportunities from the MAHO function. If traffic level in a cell is low, this means that mobile stations are not engaged in large number of calls, and thus there is a corresponding reduction in the number of MAHO measurement opportunities where frequency plan revision related downlink measurement data can be collected. Similarly, if the number of frequencies to be measured is high, there maybe insufficient time or resources available to make the required number of downlink measurements.

The foregoing data collection problem is further aggravated by the fact that each proposal related algorithm calculation generally, in accordance with known prior art schemes, considers only that data collected in a most recently completed (i.e., a current) measurement opportunity. That collected data is thereafter processed by the algorithm to determine and implement proposals. Following proposal implementation, the current data is discarded as stale and the procedure repeats itself with a brand new data collection effort and a new execution of the proposal related calculation. If an insufficient amount of data is collected in a given data collection effort, however, then subsequent execution of the proposal related algorithm calculation is abandoned and the entire procedure is repeated starting with a new data collection effort.

What is needed is a mechanism to increase the amount of mobile station collected downlink measurement data that is made available for processing by frequency plan revision procedures.

SUMMARY OF THE INVENTION

Radio environment statistics data for determining frequency plan revisions is collected in each of a plurality of separate recording periods. Following conclusion of each recording period, a frequency plan revision algorithm is executed to process the collected radio environment statistics data and determine a frequency plan revision for implementation. The collected data that is considered by the algorithm includes not only that data which was collected in a current one of the recording periods, but also that data collected in previous recording period(s) thereto.

The present invention further comprises a frequency planning tool operable to process separate recording period data collections using a frequency plan revision algorithm in order to determine a frequency plan revision for implementation. The collected data that is considered by the algorithm includes not only that data which was collected in a current one of the recording periods, but also that data collected in previous recording period(s) thereto.

In one specific embodiment of the method and tool of the present invention, the data collected in previous recording periods is considered by the algorithm provided that the quality of the previous data has not been adversely affected by a frequency plan revision implemented during an interim period time between the collection of the data and the execution of the frequency plan revision algorithm.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
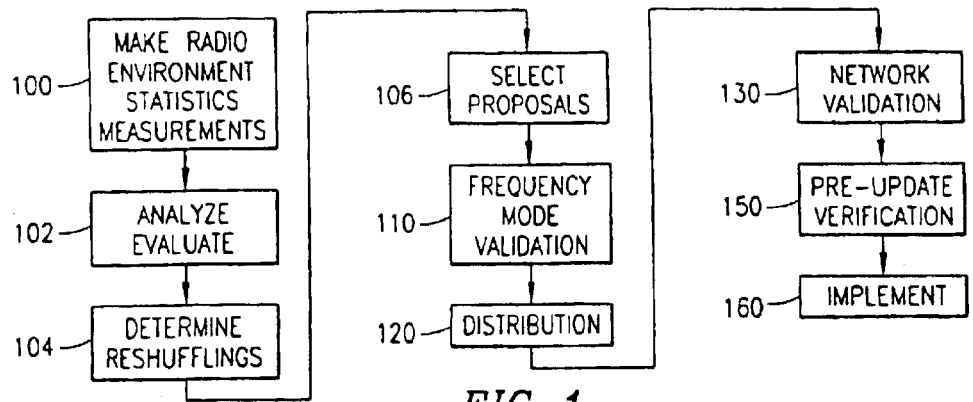
FIG. 1, previously described, is a flow diagram illustrating one type of frequency plan revision procedure known from U.S. Pat. No. 6,052,593.
Figure 2:
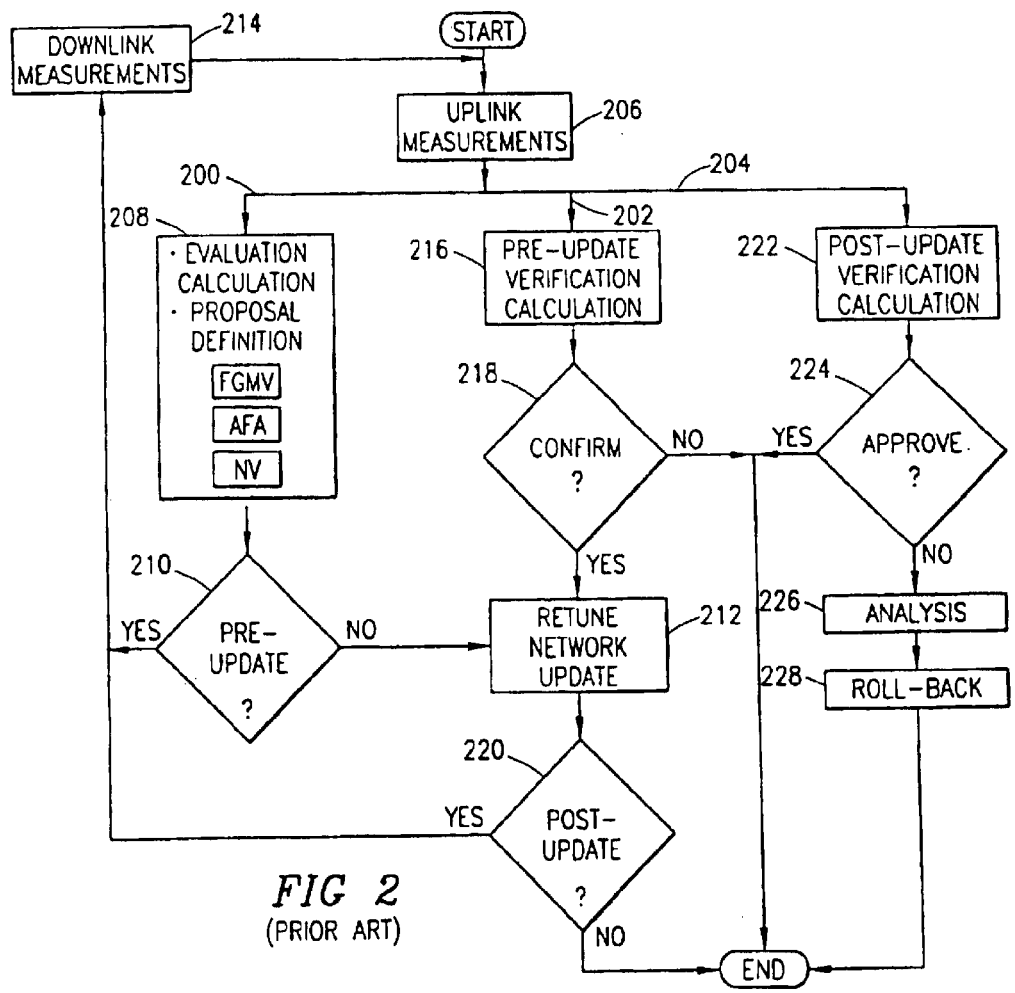
FIG. 2, previously described, is a flow diagram illustrating one type of frequency plan revision procedure known from U.S. Pat. No. 6,212,386.
Figure 3:
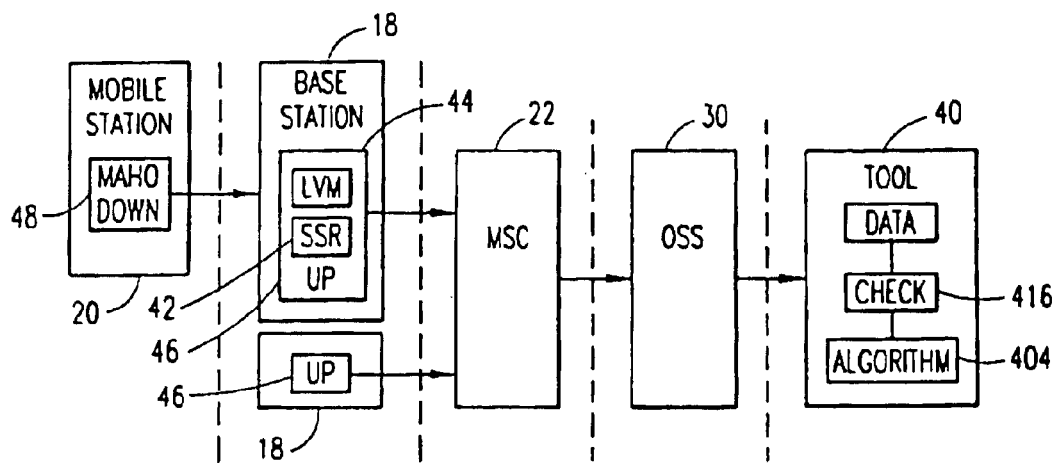
FIG. 3 is a block diagram of a portion of a cellular network.

Reference is now made to FIG. 3 wherein there is shown a block diagram of a portion of a cellular network. The network includes a base station 18 for each cell in communication with mobile stations 20. The base stations 18 are each connected to a mobile switching center 22. The mobile switching center 22 is connected to an operation support system (OSS) 30. Finally, the operation support system 30 is connected to (or comprises) an interactive frequency planning tool 40. Using this interactive frequency planning tool, and implementing procedures like those discussed above in connection with FIGS. 1 and 2, an operator may evaluate network performance, select proposals for retune, and control frequency planning.

Each base station 18 includes a signal strength receiver (SSR) 42 and a location verification module (LVM) 44. Using the signal strength receiver 42 and/or a location verification module 44, the network collects uplink interference measurements on candidate frequencies (see, UP function block 46). Filtering of these measurements is performed in the base station 18 itself before being reported back to the mobile switching center 22 and passed on to the frequency planning tool 40 through the operation support system 30. Utilizing the mobile assisted hand-off (MAHO) measurement functionality (see, DOWN function block 48) of the mobile stations 20, downlink interference measurements are made on the candidate frequencies and are reported to the operation support system 30 through the base station 18 and the mobile switching center 22. Filtering of these measurements is performed in the mobile switching center 22 before being reported to the frequency planning tool 40 through the operation support system 30. Uplink bit error rate measurements on selected frequencies are made by the base stations 18 on the digital voice channels and are reported to the operation support system 30 through the mobile switching center 22. Downlink bit error rate measurements on selected frequencies are made by the mobile stations 20 on the digital voice channels and are reported to the operation support system 30 through the base station 18 and the mobile switching center 22. Filtering of these bit error rate measurements is performed in the operation support system 30, with the filtered information reported to the frequency planning tool 40. Uplink analog interference measurements on selected frequencies are made by the base stations 18 on the analog voice channels and are reported to the operation support system 30 through the mobile switching center 22. Filtering of these uplink interference measurements is performed in the operation support system 30, with the filtered information reported to the frequency planning tool 40. Finally, uplink digital interference measurements on selected frequencies are made by the base stations 18 on the digital voice channels. Filtering of these measurements is performed in the base station 18 itself before being reported back to the mobile switching center 22 and passed on to the frequency planning tool 40 through the operation support system 30. The filtering operations performed on these radio environment statistics measurements, as described above, generally comprise the application of infinite impulse response (IIR) filtering techniques on the collected data before it is communicated to the frequency planning tool 40.

Figure 4:
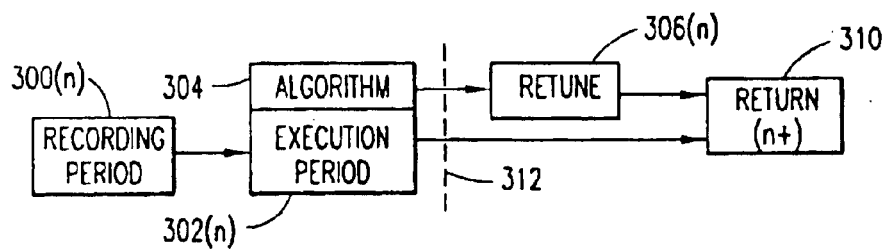
FIG. 4 is a timing and flow diagram illustrating the interaction between data collection efforts and frequency plan revision algorithm execution in accordance with the prior art.

Reference is now made to FIG. 4 wherein there is shown a timing and flow diagram illustrating the interaction between data collection efforts and frequency plan revision execution in accordance with the prior art. A general procedure for frequency plan revision tool operation is to first allow for a recording period 300 to occur. Within each recording period 300, data (such as radio environment statistics data) is collected, the collected data is then IIR filtered, and the filtered data is reported. This recording period 300 may last for any operator specified length of time, but is preferably long enough to collect a statistically significant amount of data. The operator may also choose to set the recording period to occur at any selected time of day, but it preferably occurs when traffic levels on the network are high enough (such as during peak morning and afternoon times) to further ensure that enough data is collected. It is also recognized that the recording period may extend over more than one day if desired. Following expiration of the recording period 300, the collected data is then processed in an execution period 302.

During a current execution period 302(n) (wherein "n" designates a current time period under consideration), the data collected in the current recording period 300(n) is evaluated in the context of a certain frequency planning algorithm 304 to determine one or more frequency plan retunes. The algorithm 304 may comprise any one of a number of known or to be developed frequency planning tool algorithms that rely on mobile station and base station collected radio environment statistics data. Following execution of the execution period 302, the collected data is then discarded as stale (schematically illustrated at 312). The step 304 determined retunes are then implemented in a current retune event 306(n). In instances where insufficient data is collected in the current recording period 300(n), the algorithm 304 execution is terminated, and the current retune 306(n) is skipped (see, path 308). Following a retune 308 or a skip 308, the procedure then returns (see, block 310) back to execute a new recording period 300 (indicated as (n+), wherein "n+" designates a subsequent time period) and collects new data for the next algorithm 304 evaluation.

Figure 5:
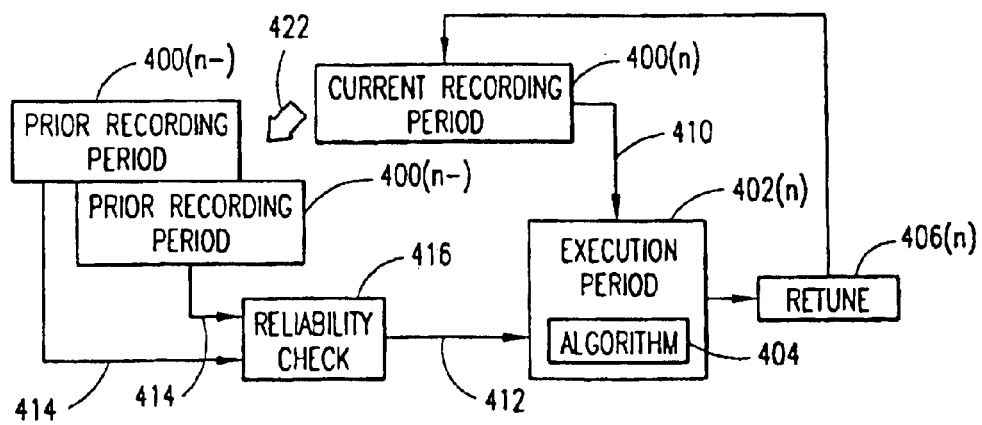
FIG. 5 is a timing and flow diagram illustrating the interaction between data collection efforts and frequency plan revision execution in accordance with the present invention.

FIG. 5 is a timing and flow diagram illustrating the interaction between data collection efforts and frequency plan revision execution in accordance with the present invention. A recording period 400 is used to collect data (such as radio environment statistics data like uplink and/or downlink radio quality data) that is reported (possibly following some IIR filtering). This recording period 400 may last for any operator specified length of time, but notably need not necessarily be set such that it is long enough by itself to collect a statistically significant amount of data. The operator may also choose to set the recording period to occur at any selected time of day, but it preferably occurs when traffic levels on the network are high.

Following expiration of a current recording period 400(n) (wherein "n" designates a current time period under consideration), the data is then processed in a current execution period 402(n). During the current execution period 402(n), not only the data 410 collected in the current recording period 400(n), but also the data 412 collected 414 in previous (i.e., not immediately preceding) recording period(s) 400(n−) (wherein "n−" designates one or more past recording periods—with the data collected in those past periods also referred to as "historical" data), is evaluated in the context of a certain frequency planning algorithm 404 to determine one or more frequency plan retunes. The algorithm 404 may comprise any one of a number of known or to be developed frequency planning tool algorithms that rely on mobile station and base station collected radio environment statistics data. The step 404 determined retunes are then implemented in a current retune event 406(n). The process then repeats 420 itself with previously collected data from what was the current recording period 400(n) being moved 422 into the historical recording period(s) 400(n−) data.

The data 412 preferably comprises "reliable" historical data 412 collected from previous recording period(s) 400 (n−). A reliability check process 416 may be used to filter the historical data and select for algorithm consideration the reliable data. The data 412 from previous recording periods 400(n−) that is considered to be reliable is added (concatenated) in the execution period 402 to the data collected in the current recording period 400(n). This acts to supplement the currently collected data and allows the subsequently executed algorithm 404 to have access to, and process on, more pieces of data than would be available from a single recording period alone (such as was the case in the prior art method of FIG. 4 and its recording period 300). This can be quite important if an insufficient amount of data (for example, not statistically significant, or below a threshold) was collected in the current recording period 400(n) or if a retune 406 could not be completed in a timely manner. In such a situation, the prior art process of FIG. 4 would typically terminate algorithm 304 execution with respect to the collected data and wait until sufficient data was collected in a later/next recording period 300. In the context of the FIG. 5 process, however, a sufficient amount of data to execute the algorithm 404 may be assembled through the consideration of not only the current recording period 400(n) collected data but also the previously collected (and preferably, reliable 416) historical data from past recording period(s) 400(n–).

Figure 6:
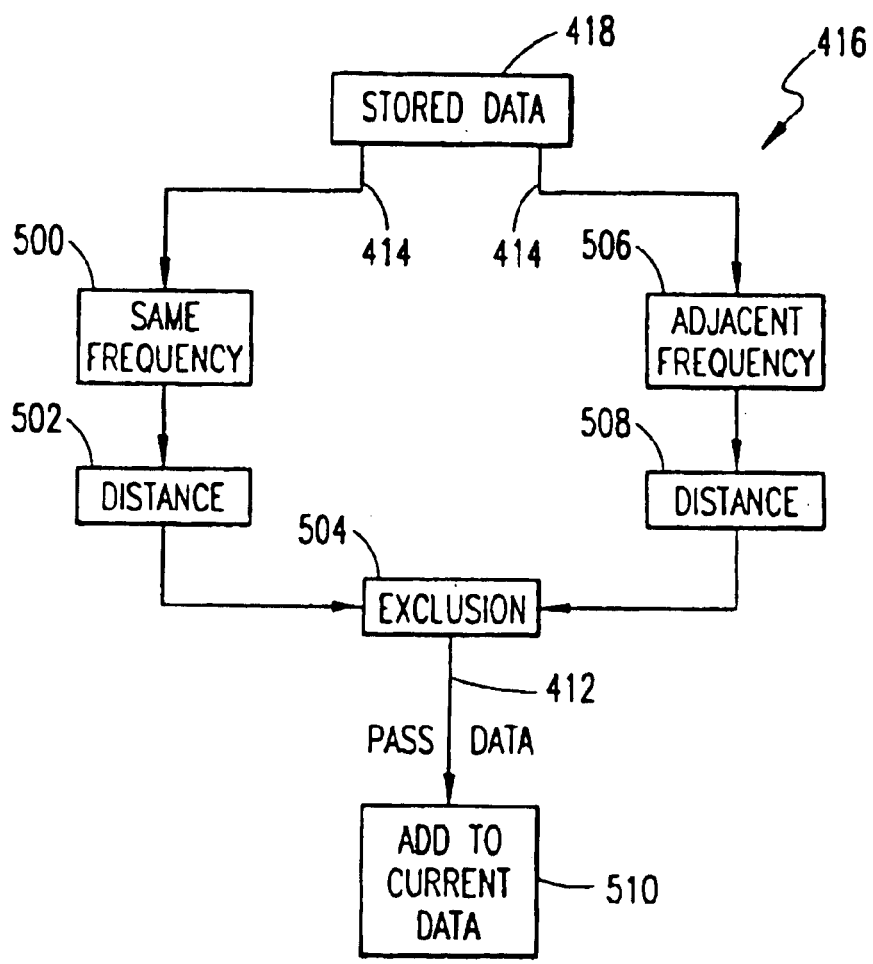
FIG. 6 is a flow diagram of a reliability check procedure in accordance with the present invention.

Reference is now made to FIG. 6 which illustrates a flow diagram for the reliability check process 416 of the present invention. As discussed above, all recording period 400 collected data is communicated to the tool 40 and is stored 418. The reliability check process 416 operates on the stored data 414 (comprising that data from past recording periods 400(n–)) to filter in the following manner:

(a) if a collected piece of the stored data relates to a frequency f in cell A, and if there has been a retune 406 that switches a cell B to the same frequency f in the interim period of time since the collection of that data (collectively step 500—same frequency test), and if cell B is located within a certain distance of cell A (step 502—nearby distance test), then that piece of historical data is not reliable and is not thereafter considered by the algorithm 404 (step 504—data exclusion); and (b) if a collected piece of the stored data relates to a frequency f in cell A, and if there has been a retune 406 that switches a cell B to an adjacent frequency f± in the interim period of time since the collection of that data (collectively step 506—adjacent frequency test), and if cell B is located within a certain distance of cell A (step 508—nearby distance test), then that piece of historical data is not reliable and is not thereafter considered by the algorithm 404 (step 504—data exclusion).

Data 412 comprising the historical data from past recording periods 400(n–) that passes the reliability check is added (step 510) to the data collected in the current recording period 400(n). This aggregate data is then processed in the execution period 402 by the algorithm 404 (see, FIG. 5). The foregoing procedure may be used on any collected piece of radio environment statistics data, but finds its preferred use in connection with the regulation of downlink related data collected by the mobile station during MAHO.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method, comprising the steps of:
collecting radio environment statistics data for determining frequency plan revisions during each one of a plurality of separate recording periods; and
executing a frequency plan revision algorithm following a conclusion of each separate recording period in order to process the collected radio environment statistics data and determine a frequency plan revision for implementation, the collected radio environment statistics data that is processed by the frequency plan revision algorithm including both (a) the radio environment statistics data collected in a current one of the plurality of separate recording periods, and (b) the radio environment statistics data collected in at least one of the plurality of separate recording periods previous to the current period.

2. The method as in claim 1 wherein the recited (b) included data processed by the algorithm provided comprises only the radio environment statistics data collected in previous recording period(s) that has not been adversely affected by a frequency plan revision implemented during an interim period time between the recording period when the data was collected and the execution of the frequency plan revision algorithm.

3. The method as in claim 2 further comprising the step of executing a reliability check on the collected radio environment statistics data from previous recording periods to exclude from frequency plan revision algorithm consideration the adversely affected data.

4. The method as in claim 3 wherein the step of executing the reliability check comprises the steps of:
testing whether a collected piece of the radio environment statistics data relates to a frequency f in a cell A, and whether the interim implemented frequency plan revision has switched a nearby cell B to the same frequency f;
excluding the collected piece of radio environment statistics data as adversely affected data if the foregoing test is satisfied.

5. The method as in claim 4 wherein the step of testing further comprises the step of testing whether cell B is located within a certain distance of cell A.

6. The method as in claim 3 wherein the step of executing the reliability check comprises the steps of:
testing whether a collected piece of the radio environment statistics data relates to a frequency f in a cell A, and whether the interim implemented frequency plan revision has switched a nearby cell B to an adjacent frequency f±; and
excluding the collected piece of radio environment statistics data as adversely affected data if the foregoing test is satisfied.

7. The method as in claim 6 wherein the step of testing further comprises the step of testing whether cell B is located within a certain distance of cell A.

8. The method as in claim 1 further including the step of implementing the determined frequency plan revision.

9. The method as in claim 1 wherein the step of collecting radio environment statistics data comprises the step of collecting uplink radio quality data.

10. The method as in claim 1 wherein the step of collecting radio environment statistics data comprises the step of collecting downlink radio quality data.

11. The method as in claim 10 wherein the downlink radio quality data is collected during mobile assisted handoff (MAHO) operation.

12. A frequency planning tool, comprising:
storage for saving radio environment statistics data for determining frequency plan revisions, that data having been collected in each one of a plurality of separate recording periods; and
a frequency plan revision algorithm executed following a conclusion of a separate recording period that processes both the radio environment statistics data collected in the currently completed recording period and data from previous recording periods thereto in order to determine a frequency plan revision for implementation.

13. The tool as in claim 12 further including a filter that selects reliable data collected in recording periods prior to a currently completed recording period for processing by the frequency plan revision algorithm along with the data from the current recording period.

14. The tool as in claim 13 wherein the filter identifies the reliable data as that data that has not been adversely affected by a frequency plan revision implemented since the previous recording period when the data was collected.

15. The tool as in claim 14 wherein the filter excludes a piece of the radio environment statistics data collected in a previous recording period if it relates to a frequency f in a cell A, and a frequency plan revision implemented after the previous recording has switched a nearby cell B to the same frequency f.

16. The tool as in claim 14 wherein the filter excludes a piece of the radio environment statistics data collected in a previous recording period if it relates to a frequency f in a cell A, and a frequency plan revision implemented after the previous recording period has switched a nearby cell B to an adjacent frequency f±.

17. A frequency planning tool, comprising:
storage for saving radio environment statistics data for determining frequency plan revisions, that data having been collected in each one of a plurality of separate recording periods;
a reliability check process that identifies a portion of the stored radio environment statistics data collected in recording periods prior to a currently completed recording period that has not been adversely affected by a frequency plan revision implemented since the recording period when the radio environment statistics data was collected; and
a frequency plan revision algorithm executed following a conclusion of each separate recording period that processes both the radio environment statistics data collected in the currently completed recording period and the portion of the stored data identified by the reliability check in order to determine a frequency plan revision for implementation.

18. The tool as in claim 17 wherein the reliability check process tests the saved radio environment statistics data from previous one or ones of the plurality of separate recording periods to exclude from frequency plan revision algorithm consideration the adversely affected data.

19. The tool as in claim 17 wherein the reliability check process excludes a collected piece of the radio environment statistics data if it relates to a frequency f in a cell A, and a frequency plan revision implemented since the previous recording period has switched a nearby cell B to the same frequency f.

20. The tool as in claim 17 wherein the reliability check process excludes a collected piece of the radio environment statistics data if it relates to a frequency f in a cell A, and a frequency plan revision implemented since the previous recording period has switched a nearby cell B to an adjacent frequency f±.

21. The tool as in claim 17 wherein the collected radio environment statistics data comprises uplink radio quality data.

22. The tool as in claim 17 wherein the collected radio environment statistics data comprises downlink radio quality data.

23. The tool as in claim 22 wherein the downlink radio quality data is collected during mobile assisted handoff (MAHO) operation.

24. A method, comprising the steps of:
collecting radio environment statistics data for determining frequency plan revisions during a current one of a plurality of separate recording periods;
filtering collected radio environment statistics data collected in previous recording periods to the current period to identify reliable data; and
executing a frequency plan revision algorithm following a conclusion of the current recording period that evaluates both the data from the current recording period and the identified reliable data in order to determine a frequency plan revision for implementation.

25. The method as in claim 24 wherein the step of filtering comprises the step selecting only that radio environment statistics data collected in previous recording periods that has not been adversely affected by a frequency plan revision implemented during an interim period time between the previous recording period when the data was collected and the execution of the frequency plan revision algorithm.

26. The method as in claim 25 wherein the step of selecting comprises the steps of:
testing whether a piece of the radio environment statistics data collected in the previous recording period relates to a frequency f in a cell A, and whether the interim implemented frequency plan revision has switched a nearby cell B to the same frequency f;
excluding the collected piece of radio environment statistics data as adversely affected data if the foregoing test is satisfied.

27. The method as in claim 26 wherein the step of testing further comprises the step of testing whether cell B is located within a certain distance of cell A.

28. The method as in claim 24 wherein the step of selecting comprises the steps of:
testing whether a piece of the radio environment statistics data collected in a previous recording period relates to a frequency f in a cell A, and whether the interim implemented frequency plan revision has switched a nearby cell B to an adjacent frequency f±; and
excluding the collected piece of radio environment statistics data as adversely affected data if the foregoing test is satisfied.

29. The method as in claim 28 wherein the step of testing further comprises the step of testing whether cell B is located within a certain distance of cell A.

* * * * *